D. C. HINDMAN.
WRENCH.
APPLICATION FILED MAY 10, 1916.
1,191,596.
Patented July 18, 1916.
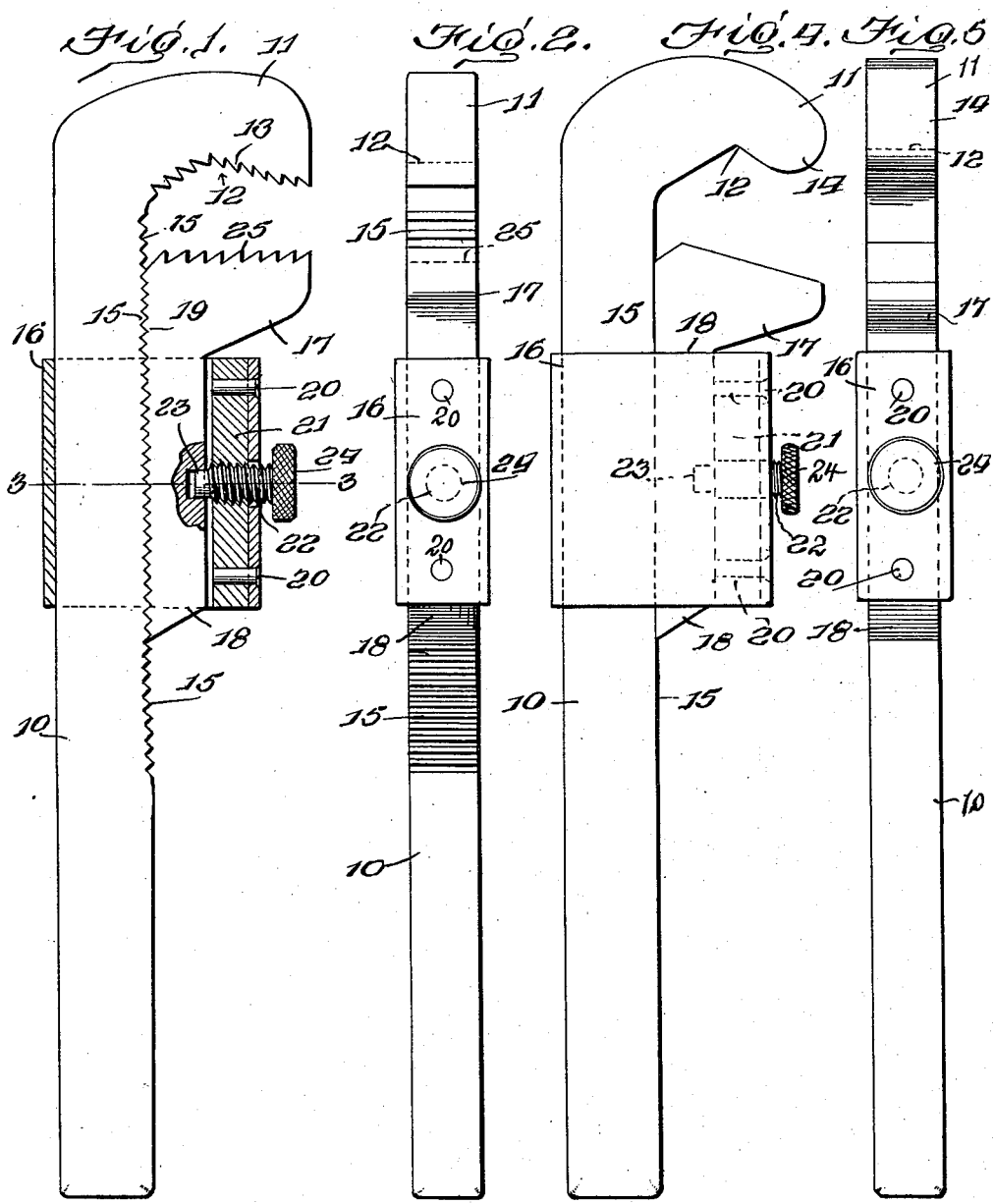
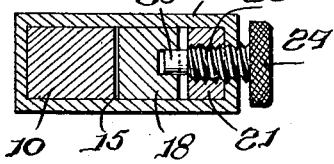
Inventor
D. C. Hindman

UNITED STATES PATENT OFFICE.

DAVID C. HINDMAN, OF RUSHVILLE, ILLINOIS, ASSIGNOR OF ONE-THIRD TO PETER A. SCHULTZ, OF RUSHVILLE, ILLINOIS.

WRENCH.

1,191,596.  Specification of Letters Patent.  Patented July 18, 1916.

Application filed May 10, 1916. Serial No. 96,663.

*To all whom it may concern:*

Be it known that I, DAVID C. HINDMAN, a citizen of the United States, residing at Rushville, in the county of Schuyler and State of Illinois, have invented certain new and useful Improvements in Wrenches, of which the following is a specification.

This invention relates to improvements in wrenches, and has for one of its objects to improve the construction and increase the efficiency and utility of devices of this character.

Another object of the invention is to provide a device of this character which may be readily adapted without material structural change for use as a pipe or rod wrench or as an ordinary nut actuating wrench.

With these and other objects in view, the invention consists in certain novel features of construction, as hereinafter shown and described and then specifically pointed out in the claims; and in the drawings illustrative of the preferred embodiment of the invention—Figure 1 is a side elevation, partly in section, of the improved device; Fig. 2 is an edge view of the structure shown in Fig. 1; Fig. 3 is a section on the line 3—3 of Fig. 1; Fig. 4 is a view similar to Fig. 1 illustrating a modification in the construction; Fig. 5 is an edge view of the structure disclosed in Fig. 4.

Corresponding and like parts are referred to in the following description and indicated in all the views of the drawings by the same reference characters.

The improved device comprises a stock 10 extended at one end into a hand grip and with a stationary jaw 11 extending laterally therefrom at one end. The jaw 11 is shown with its inner face hollowed, as shown at 12, and provided with gripping teeth 13 in the hollowed face when arranged as a pipe or rod wrench. In Fig. 1 the operating face of the jaw 11 is relatively long, while in the modified structure shown in Fig. 4 the operating face 12 is shorter than in Fig. 1 and the outer terminal of the jaw 11 rounded, as shown at 14.

When arranged as a pipe wrench, one face of the stock 10 is provided with a plurality of transverse teeth 15, as shown. Slidably disposed upon the stock 10 is a sleeve represented as a whole at 16 and bearing relatively close against the side faces of the stock and greater in width than the stock so that the sleeve projects for a considerable distance beyond one edge of the stock. The movable jaw of the wrench is represented at 17 and is provided with an integral shank or projection 18, the latter extending through the sleeve 16, as shown more particularly in Fig. 1. When arranged as a pipe wrench the inner face of the jaw 17 and of the stock 18 is provided with teeth 19 corresponding to and adapted to engage with the teeth 15 of the stock. Secured in any suitable manner, as for instance by rivets 20, in the sleeve 16 is a block 21. Operating through one wall of the sleeve 16 and tapped through the block 21 is a clamp screw 22 reduced at its inner end, as shown at 23, to engage in a corresponding socket in the adjacent face of the shank 18. The screw 20 is provided with means such as a milled head 24 to enable it to be manually actuated. By this means the stock 18, together with its integral jaw 17, may be forcibly compressed against the stock with the teeth 19 of the jaw 17 and its shank 18 engaging with the teeth 15 of the stock 10 and thus firmly coupling the movable jaw and its shank to the stock and likewise holding the sleeve in locked position relative to the stock. When arranged as a pipe wrench the face of the jaw 17 which confronts the stationary jaw 11 is preferably provided with pipe engaging teeth 25, as shown in Fig. 1.

When arranged as a nut engaging wrench as shown in Figs. 4 and 5, the stock 10 and shank 18 will be without the teeth 15—19 and the jaws 11 and 17 also without the gripping teeth 13 and 25.

By this arrangement of parts it will be obvious that the jaw 17, together with its shank 18, may be readily adjusted longitudinally of the stock 10 and locked in any desired adjusted position to control the space between the jaws 17—11 to adapt them to any size of pipe or rod or to any size of nut or other object which is to be grasped. The jaw 17 with its shank 18 is constructed from a single piece of metal, preferably steel, and the faces hardened to withstand the strains to which they will be subjected.

Figs. 3 and 4 show a slight modification in the construction consisting in forming the movable jaw 17 with an inclined face. This form of jaw face will be employed when the wrench is arranged to operate on nuts, but does not constitute a departure from the principle of the invention or sacrifice any of its advantages.

It will be noted that the socket in the shank 18 for the reduced end 23 of the clamp screw 22 is of sufficient depth so that the movable jaw and its shank will not drop out of the sleeve 16 when released for the adjustment of the sleeve and movable jaw upon the stock. It will also be noted that it is not necessary to remove the wrench from the nut when changing the position to grip another face of the nut.

The improved implement is simple in construction, of few parts, and is not liable, therefore, to get out of order, and operates effectually for the purposes described.

Having thus described the invention, what is claimed as new is:

1. A wrench including a stock having a stationary lateral jaw, a sleeve slidable on the stock, a movable jaw having an integral shank movable in the sleeve, a block secured within said sleeve, and means operating through the block for engaging the shank of said movable jaw and holding it with its teeth in engagement with the stock.

2. A wrench including a stock having teeth in one face and a stationary lateral jaw, a sleeve slidable on the stock, a movable jaw having an integral shank provided with a socket and movable in the sleeve and with teeth in the movable jaw and in its shank to engage the teeth of said stock, and a clamp screw operating through the sleeve and reduced at the inner end for engaging the socket of said movable jaw and holding it with its teeth and the teeth of the movable jaw in engagement with the teeth of the stock.

3. A wrench including a stock having teeth in one face and a stationary lateral jaw, a sleeve slidable on the stock, a movable jaw having an integral shank movable in the sleeve and with teeth to engage the teeth of said stock, and means operating through the sleeve for engaging the shank of said movable jaw and holding it with its teeth in engagement with the teeth of the stock.

4. A wrench including a stock having teeth in one face and a stationary lateral jaw, a sleeve slidable on the stock, a movable jaw having an integral shank movable in the sleeve and with teeth in the movable jaw and in its shank to engage the teeth of said stock, and means operating through the sleeve for engaging the shank of said movable jaw and holding it with its teeth and the teeth of the movable jaw in engagement with the teeth of the stock.

In testimony whereof I affix my signature.

DAVID C. HINDMAN. [L. S.]

Copies of this patent may be obtained for five cents each, by addressing the "Commissioner of Patents, Washington, D. C."